(12) United States Patent
Nakhla et al.

(10) Patent No.: US 12,472,853 B2
(45) Date of Patent: Nov. 18, 2025

(54) CHILD RESTRAINT

(71) Applicant: Dorel Juvenile Group, Inc., Foxboro, MA (US)

(72) Inventors: Said S. Nakhla, Daphne, AL (US); Paul Powers, Grafton, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 451 days.

(21) Appl. No.: 17/970,072

(22) Filed: Oct. 20, 2022

(65) Prior Publication Data

US 2023/0126076 A1    Apr. 27, 2023

Related U.S. Application Data

(60) Provisional application No. 63/270,307, filed on Oct. 21, 2021.

(51) Int. Cl.
*B60N 2/28*    (2006.01)
*A47D 1/10*    (2006.01)

(52) U.S. Cl.
CPC ......... *B60N 2/2821* (2013.01); *B60N 2/2812* (2013.01); *B60N 2/2881* (2013.01)

(58) Field of Classification Search
CPC .. B60N 2/2821; B60N 2/2812; B60N 2/2875; B60N 2/2851; B60N 2/286; B60N 2/2806; B60R 22/105
See application file for complete search history.

(56) References Cited

U.S. PATENT DOCUMENTS

| | | | | |
|---|---|---|---|---|
| 5,551,751 A | * | 9/1996 | Sedlack | B60N 2/2875 297/216.19 |
| 5,722,719 A | * | 3/1998 | Glomstad | B60N 2/2884 297/216.19 |
| 6,139,101 A | * | 10/2000 | Berringer | B60N 2/2821 297/256.16 |
| 6,739,661 B1 | * | 5/2004 | Dukes | B60N 2/286 297/256.13 |
| 6,779,843 B2 | | 8/2004 | Kain | |
| 7,658,446 B2 | * | 2/2010 | Meeker | B60N 2/2821 297/256.16 |
| 7,857,386 B2 | | 12/2010 | Van der Vegt | |
| 7,862,117 B2 | | 1/2011 | Hutchinson | |
| 7,901,003 B2 | * | 3/2011 | Meeker | B60N 2/2851 297/250.1 |
| 8,186,757 B2 | * | 5/2012 | Duncan | B60N 2/2821 297/256.16 |
| 8,496,293 B2 | | 7/2013 | Gaudreau, Jr. | |
| 8,550,567 B2 | | 10/2013 | Biaud | |
| 8,622,478 B2 | | 1/2014 | Spence | |

(Continued)

FOREIGN PATENT DOCUMENTS

CN    108045279    5/2018

*Primary Examiner* — Shin H Kim
(74) *Attorney, Agent, or Firm* — Barnes & Thornburg LLP (57) ABSTRACT

A child restraint comprising an outer seat-support shell adapted to rest on a vehicle seat and to be secured to the vehicle seat for transportation in a vehicle and an inner juvenile seat coupled to the outer seat-support shell. The inner juvenile seat is configured to provide a child-receiving space sized to receive a child therein. The child restraint further includes a child restraint harness configured to secure the child within a child-receiving space of the inner juvenile seat.

18 Claims, 6 Drawing Sheets

(56) References Cited

U.S. PATENT DOCUMENTS

| | | | | |
|---|---|---|---|---|
| 9,010,857 B2* | 4/2015 | Chen | ............. | B60N 2/2875 |
| | | | | 297/256.13 |
| 9,452,695 B2* | 9/2016 | Sedlack | ............. | B60N 2/2875 |
| 9,771,007 B2* | 9/2017 | Shellenberger | ...... | B60N 2/2821 |
| 10,011,199 B2* | 7/2018 | Clement | ............. | B60N 2/2821 |
| 10,293,713 B2* | 5/2019 | Anderson | ............. | B60N 2/286 |
| 10,604,035 B2 | 3/2020 | Jung | | |
| 10,967,762 B2 | 4/2021 | Gay | | |
| 11,400,838 B2* | 8/2022 | Liu | ............. | B60N 2/2875 |
| 11,926,247 B2* | 3/2024 | Xiao | ............. | B60N 2/995 |
| 12,030,411 B2* | 7/2024 | Walsh | ............. | B60N 2/0812 |
| 2005/0110318 A1* | 5/2005 | Meeker | ............. | B60N 2/2812 |
| | | | | 297/130 |
| 2011/0062756 A1* | 3/2011 | Campbell | ............. | B60N 2/2851 |
| | | | | 297/250.1 |
| 2012/0242129 A1* | 9/2012 | Gaudreau, Jr. | ...... | B60N 2/2812 |
| | | | | 297/256.16 |
| 2013/0088058 A1* | 4/2013 | Szakelyhidi | ......... | B60N 2/2816 |
| | | | | 297/256.16 |
| 2015/0091348 A1* | 4/2015 | Juchniewicz | ........ | B60N 2/2857 |
| | | | | 297/256.16 |
| 2016/0059748 A1* | 3/2016 | Cohen | ............. | B60N 2/286 |
| | | | | 297/468 |
| 2016/0368400 A1* | 12/2016 | Taylor | ............. | B60N 2/2875 |
| 2021/0039526 A1 | 2/2021 | Lehman | | |

* cited by examiner

FIG. 9 ived in the seat receiving space and is configured to provide a child-receiving space sized to receive a child therein. The inner juvenile seat is coupled to the outer seat-support shell so as to be supported in spaced apart relation to the vehicle seat and is configured to move selectively relative to the outer seat-support shell to change a recline orientation of the inner juvenile seat relative to the outer seat-support shell.

CHILD RESTRAINT

PRIORITY CLAIM

This application claims priority under 35 U.S.C. § 119(e) to U.S. Provisional Application Ser. No. 63/270,307, filed Oct. 21, 2021, which is expressly incorporated by reference herein.

BACKGROUND

The present disclosure relates to a child restraint, and particularly to a child restraint including a juvenile seat. More particularly, the present disclosure relates to child restraint including a juvenile seat and that is configured to be secured to a vehicle seat for transportation in the vehicle.

SUMMARY

According to the present disclosure, a child restraint adapted to be secured to a vehicle seat includes a seat-support shell and an inner juvenile seat supported by the seat-support shell. The outer seat-support shell is adapted to rest on the vehicle seat and to be secured to the vehicle seat for transportation in a vehicle. The outer seat-support shell provides a seat receiving space which receives at least a portion of the inner juvenile seat. The inner juvenile seat is at least partially received in the seat receiving space and is configured to provide a child-receiving space sized to receive a child therein. The inner juvenile seat is coupled to the outer seat-support shell so as to be supported in spaced apart relation to the vehicle seat and is configured to move selectively relative to the outer seat-support shell to change a recline orientation of the inner juvenile seat relative to the outer seat-support shell.

In illustrative embodiments, the child restraint further includes an occupant-seat anchor system configured to secure the inner juvenile seat to the seat-support shell and configured to secure the child to the inner juvenile seat. The occupant-seat anchor system includes a child restraint harness configured to secure the child within the child-receiving space of the inner juvenile seat and a plurality of harness anchors extending between and interconnecting the inner juvenile seat and the seat-support shell. The child restraint harness is connected directly to at least some of the plurality of harness anchors to transfer loads imparted on the child restraint harness by the child directly into the seat-support shell during impact events.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
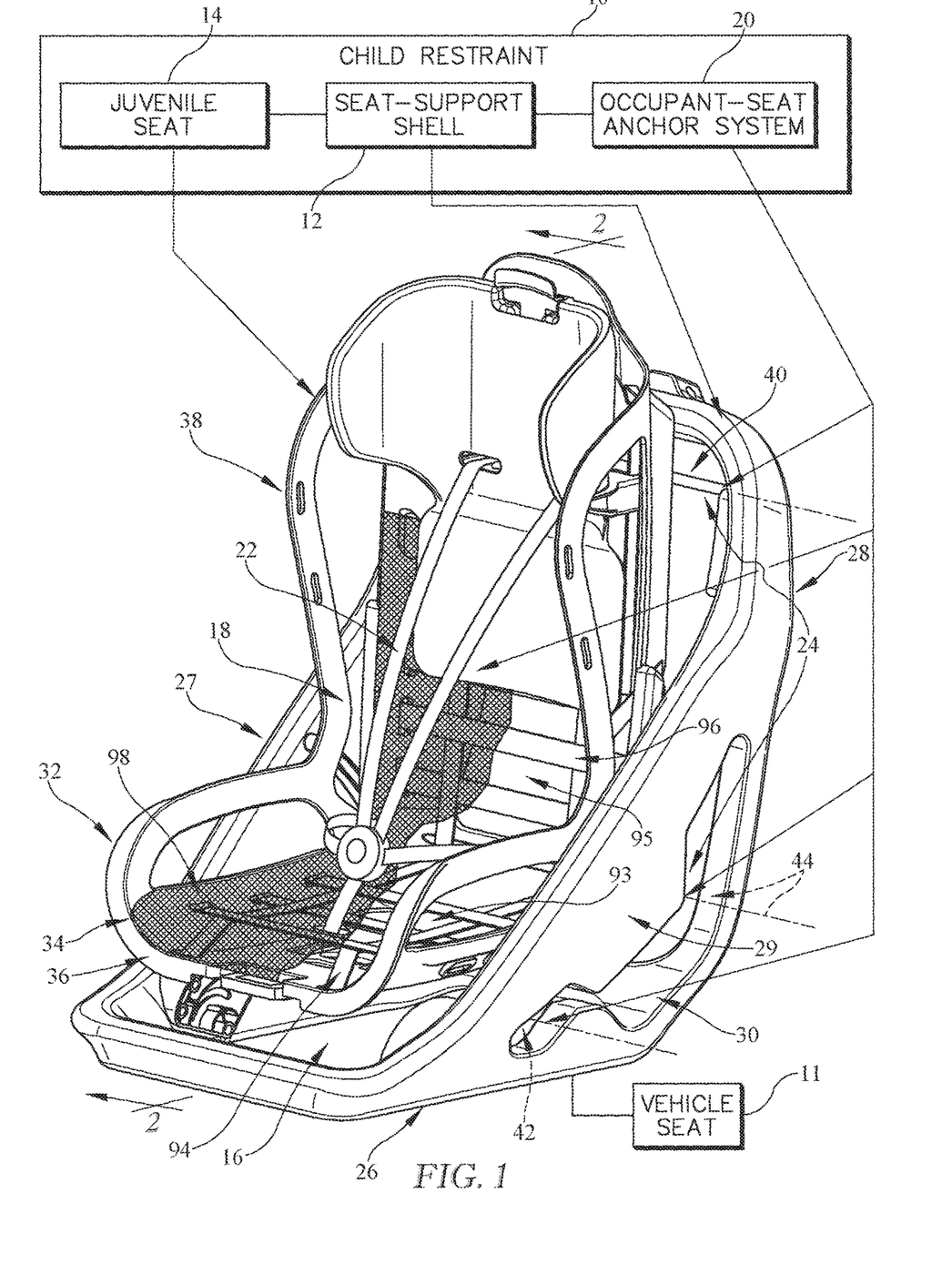
FIG. 1 is a perspective and diagrammatic view of a child restraint, in accordance with the present disclosure, including an seat-support shell configured to rest on a vehicle seat and to be secured to the vehicle seat, an inner juvenile seat coupled to the outer seat-support shell and configured to support a child for transportation in the vehicle, and an occupant-seat anchor system including a child restraint harness configured to secure the child to the juvenile seat and a plurality of harness anchors that are coupled to the child restraint harness and to the seat-support shell to transfer loads imparted on the child restraint harness by the child directly into the seat-support shell during impact events.

A child restraint 10 is adapted to be secured to a vehicle seat 11 is shown in FIG. 1. The child restraint 10 includes an outer, seat-support shell 12 and an inner juvenile seat 14 supported by the seat-support shell 12. The outer seat-support shell 12 is adapted to rest on the vehicle seat 11 and to be secured to the vehicle seat 11 for transportation in a vehicle. The outer seat-support shell 12 is formed to include a seat receiving space 16 which receives at least a portion of the inner juvenile seat 14. The inner juvenile seat 14 is at least partially received in the seat receiving space 16 and is formed to include a child-receiving space 18 sized to receive a child therein. The inner juvenile seat 14 is coupled to the outer seat-support shell 12 so as to be supported in spaced apart relation to the vehicle seat 11 and is configured to move selectively relative to the outer seat-support shell 12 to change a recline orientation of the inner juvenile seat 14 relative to the outer seat-support shell 12.

In illustrative embodiments, the child restraint 10 further includes an occupant-seat anchor system 20 configured to secure the inner juvenile seat 14 to the seat-support shell and configured to secure the child to the inner juvenile seat 14 as shown in FIG. 1. The occupant-seat anchor system 20 includes a child restraint harness 22 configured to secure the child within the child-receiving space 18 of the inner juvenile seat 14 and a plurality of harness anchors 24 extending between and interconnecting the inner juvenile seat 14 and the seat-support shell 12. The child restraint harness 22 is connected directly to at least some of the plurality of harness anchors 24 to transfer loads imparted on the child restraint harness 22 by the child directly into the seat-support shell 12 during impact events.

Figure 2:
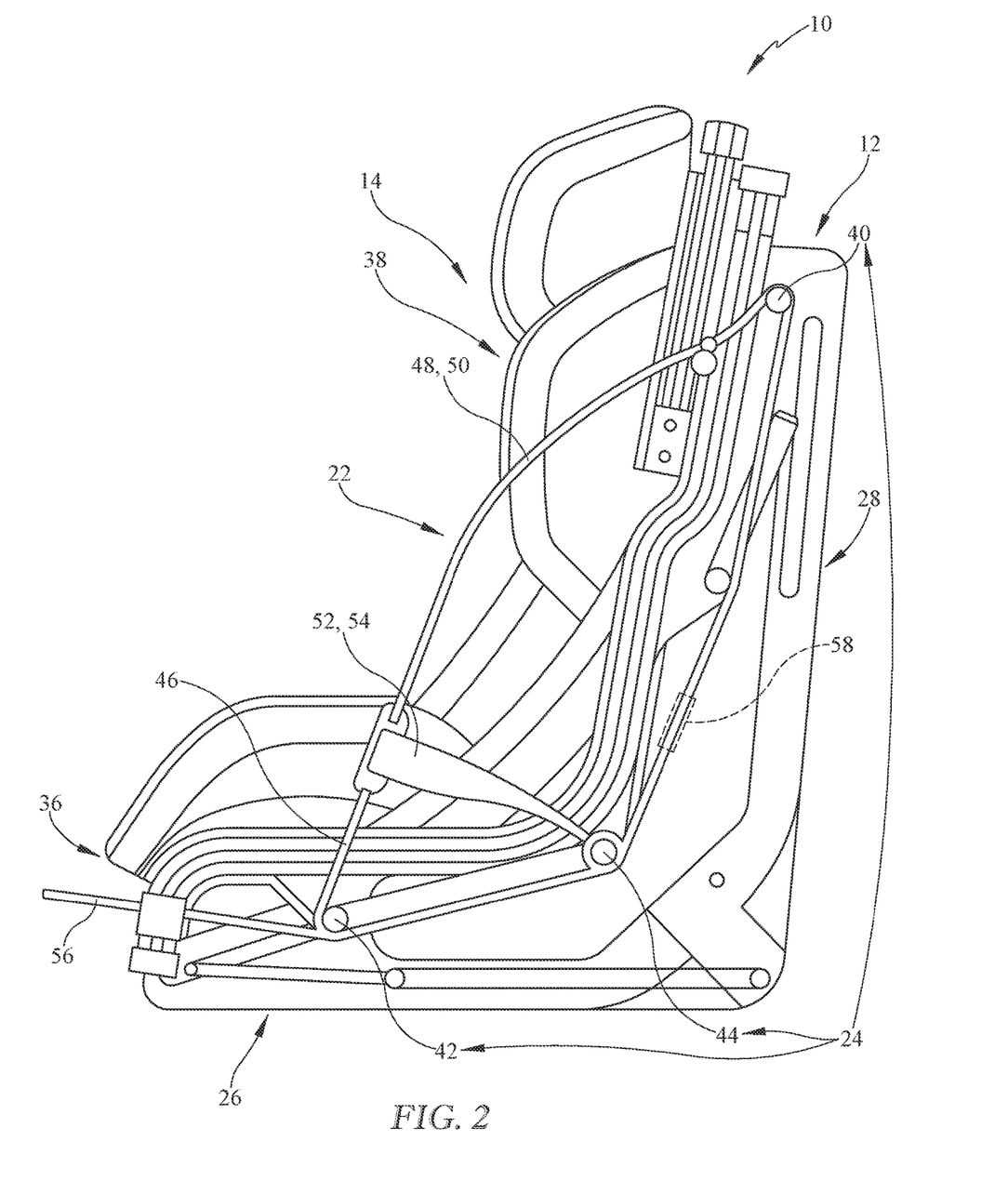
FIG. 2 is a sectional view taken along line 2-2 in FIG. 1 showing that the child restraint harness includes a central front adjuster strap routed from a front end of the juvenile seat to a first strap anchor coupled to an upper end of the seat-support shell, a pair of should straps coupled to the central front adjuster strap, a crotch strap coupled to a second strap anchor coupled to a bottom support base of the seat-support shell, and a pair of hip straps coupled to a third strap anchor coupled to the seat-support shell between the first strap anchor and the second strap anchor.
Figure 3:
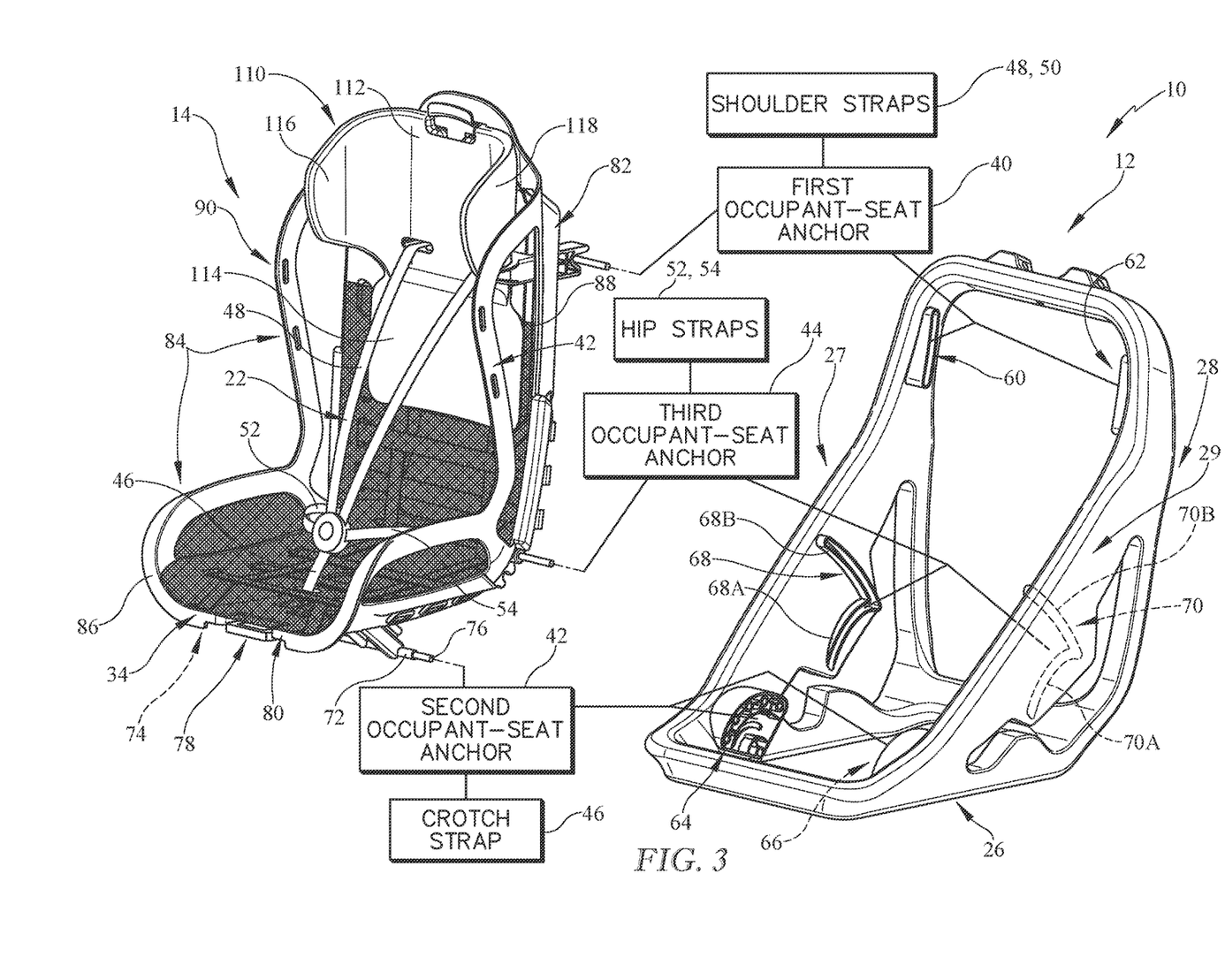
FIG. 3 is an exploded assembly diagrammatic view of the child restraint from FIGS. 1 and 2 showing, from left to right, the juvenile seat and the seat-support shell and showing that each strap anchor is configured to fit within an opening or channel formed in the seat-support shell and is movable within the opening or channel to adjust a recline orientation of the juvenile seat relative to the seat-support shell.

The seat-support shell 12 includes a shell bottom 26, a shell back 28 arranged to extend upwardly away from the shell bottom 26, and a pair of opposing side rails 27, 29 extending between the shell bottom 26 and the shell back 28 as shown in FIGS. 1-3. The shell bottom 26, the shell back 28, and the side rails 27, 29 are each formed from a rigid material such as a metal or a rigid plastic to provide structural support for the rest of the child restraint 10. The shell bottom 26, the shell back 28, and the side rails 27, 29 cooperate to provide a seat belt path 30 which is sized to receive a vehicle seat belt to secure the child restraint 10 to the vehicle seat 11. Once installed on the vehicle seat 11, the vehicle seat belt is located beneath and/or behind the inner juvenile seat 14 so that the juvenile seat 14 is free to recline relative to the seat-support shell 12 without interference with the vehicle seat belt.

The inner juvenile seat 14 includes a seat chassis 32 coupled to the plurality of harness anchors 22 and an occupant-support pad 34 coupled to the seat chassis 32 and configured to support the child as shown in FIGS. 1-3. The seat chassis 32 and the occupant-support pad 34 cooperate to provide a seat bottom 36 and a seat back 38 for the inner juvenile seat 14. The seat chassis 32 is formed from rigid materials such as a metal or a rigid plastic to provide structural support for the inner juvenile seat 14. The occupant-support pad 34 is formed from materials that are flexible and/or compressible to increase comfort for the child.

The plurality of harness anchors 24 are positioned in various locations between the seat-support shell 12 and the inner juvenile seat 14 to maximize support of the inner juvenile seat 14 and the child restraint harness 22 as shown in FIGS. 1-3. The plurality of harness anchors 24 includes a first strap anchor 40 extending between and interconnecting the shell back 28 and the seat back 38, a second strap anchor 42 extending between and interconnecting the shell bottom 26 and the seat bottom 36, and a third strap anchor 44 coupled to the side rails 27, 29 between the first and second strap anchors 40, 42. The first strap anchor 40 is located near a top end of both the seat-support shell 12 and the inner juvenile seat 14. The second strap anchor 42 is located near a front end of both the seat-support shell 12 and the inner juvenile seat 14. The third strap anchor 44 extends between and interconnects the seat-support shell 12 and the inner juvenile seat 14 at or near a junction between the seat bottom 36 and the seat back 38.

The child restraint harness 22 is fixed and/or routed around the first, second, and third strap anchors 40, 42, 44 to transfer loads directly to the seat-support shell 12 and not into the inner juvenile seat 14 as shown in FIGS. 1-3. The child restraint harness 22 includes a crotch strap 46 coupled to the second strap anchor 42, a pair of shoulder straps 48, 50 coupled to the first strap anchor 40, and a pair of hip anchors 52, 54 coupled to the third strap anchor 44. The crotch strap 46 is wrapped around the second strap anchor 42 so that the crotch strap 46 is fixed to the second strap anchor 42 for movement therewith. The pair of shoulder straps 48, 50 are routed around the first strap anchor 40 and are configured to slide relative to the first strap anchor 40 when the child-restraint harness 22 is tightened and loosened. The pair of hip straps 52, 54 are wrapped around the third strap anchor 44 so that the hip straps 52, 54 are fixed to the third strap anchor 44 for movement therewith.

The child restraint harness 22 may further include a central front adjuster strap 56 that extends from a front end of the seat bottom 36 to the pair of shoulder straps 48, 50 as shown in FIG. 2. The central front adjuster strap 56 is routed around the second and third strap anchors 42, 44. A splitter 58 may be coupled between the central front adjuster strap 56 and each of the shoulder straps 48, 50 to synchronize movement of both shoulder straps 48, 50 when the central front adjuster strap 56 is pulled.

The seat-support shell 12 is formed to include a plurality of guide slots 60, 62, 68, 70 and a plurality of recline openings 64, 66 which receive the plurality of strap anchors 24 and allow the inner juvenile seat 14 to recline relative to the seat-support shell 12 as shown in FIG. 3. The first strap anchor 40 is arranged to lie is a first pair of guide slots 60, 62 formed in opposing lateral sides of the shell back 28. The second strap anchor 42 is arranged to lie in opposing recline apertures 64, 66 formed in at least one of the shell bottom 26 and the side rails 27, 29. The third strap anchor 44 is arranged to lie in a second pair of guide slots 68, 70 formed in opposing lateral sides of the side rails 27, 29 between the first pair of guide slots 60, 62 and the plurality of recline openings 64, 66.

The second strap anchor 42 includes an outer sleeve 72 coupled to the crotch strap 46 of the child restraint harness 22 and a pair of inner pins 74, 76 that are partially received within an interior of the outer sleeve 72 as shown in FIG. 3. The inner pins 74, 76 are movable relative to the outer sleeve 72 to extend into one of the plurality of recline openings 64, 66 to block movement of the inner juvenile seat 14 relative to the seat-support shell 12. The inner pins 74, 76 are coupled to a recline actuator handle 78 mounted on a front end of the juvenile seat 14. The recline actuator handle 78 may be pulled forward by a user to withdraw the inner pins 74, 76 from their respective recline openings 64, 66. The first and third strap anchors 40, 44 are slidable through their respective guide slots 60, 62, 68, 70 when the inner pins 74, 76 are withdrawn from the recline openings 64, 66 to change the recline orientation of the inner juvenile seat 14 relative to the seat-support shell 12.

In some embodiments, the second pair of guide slots 68, 70 includes a forward-facing recline segment 68A, 70A and a rearward-facing recline segment 68B, 70B as shown in FIG. 3. The third strap anchor 44 is located in the forward-facing recline segments 68A, 70A when the child restraint 10 is in an upright, forward-facing orientation in which the shell bottom 26 rests on a seat bottom of the vehicle seat and the shell back 28 rests against a seat back of the vehicle seat. The third strap anchor 44 is located in the rearward-facing recline segments 68B, 70B when the child restraint 10 is in a laid-back, rearward-facing orientation in which the shell back 28 rests on the seat bottom of the vehicle seat and the shell bottom 26 rests against the seat back of the vehicle seat.

Figure 4:
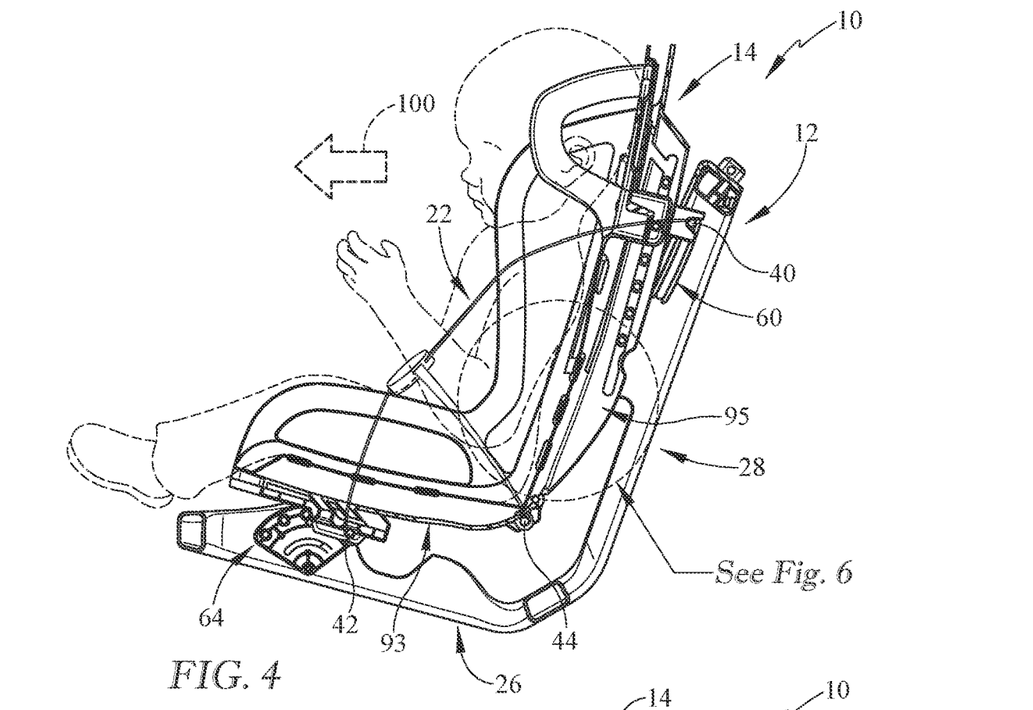
FIG. 4 is a view similar to FIG. 2 showing a child seated on the juvenile seat and secured to the juvenile seat by the child restraint harness prior to a front impact event.
Figure 5:
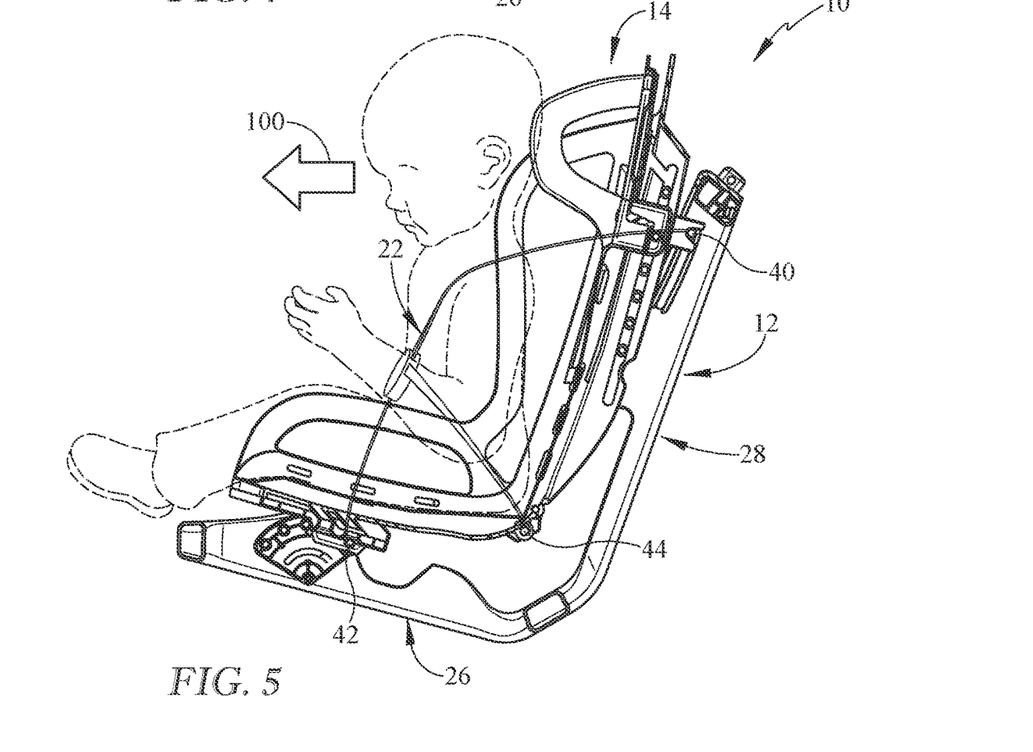
FIG. 5 is a sectional view similar to FIG. 4 showing the child moved in a forward direction following the front impact event and showing that the child restraint harness transfers loads acting on the child restraint harness by the child by directing the loads directly into the strap anchors and the seat-support shell.
Figures 6, 7, 8:
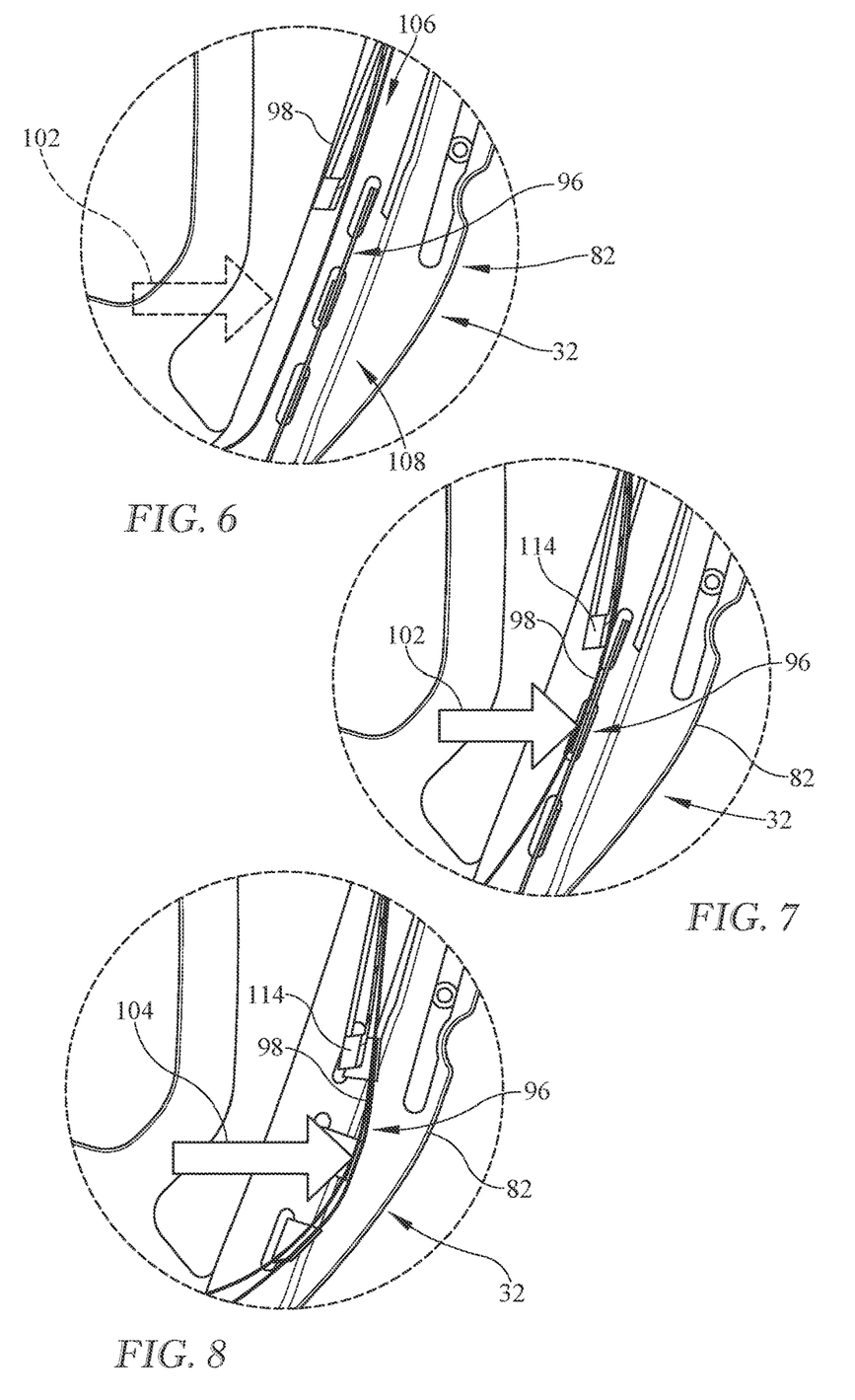
FIG. 6 is an enlarged portion of the juvenile seat of FIG. 4 showing that the juvenile seat includes an occupant-support pad including a seat back web and a mesh sheet configured to support the child and spaced apart from the seat back web prior any load acting on the mesh sheet.
FIG. 7 is a view similar to FIG. 6 showing a first load applied on the mesh sheet by the child to cause the mesh sheet to deform toward the seat back web so that the child is supported by both the mesh sheet and the seat back web.
FIG. 8 is a view similar to FIG. 7 showing a second load, greater than the first load, applied to the mesh sheet to cause the mesh sheet and the seat back web to deform by the child in response to the second load.
Figure 9:
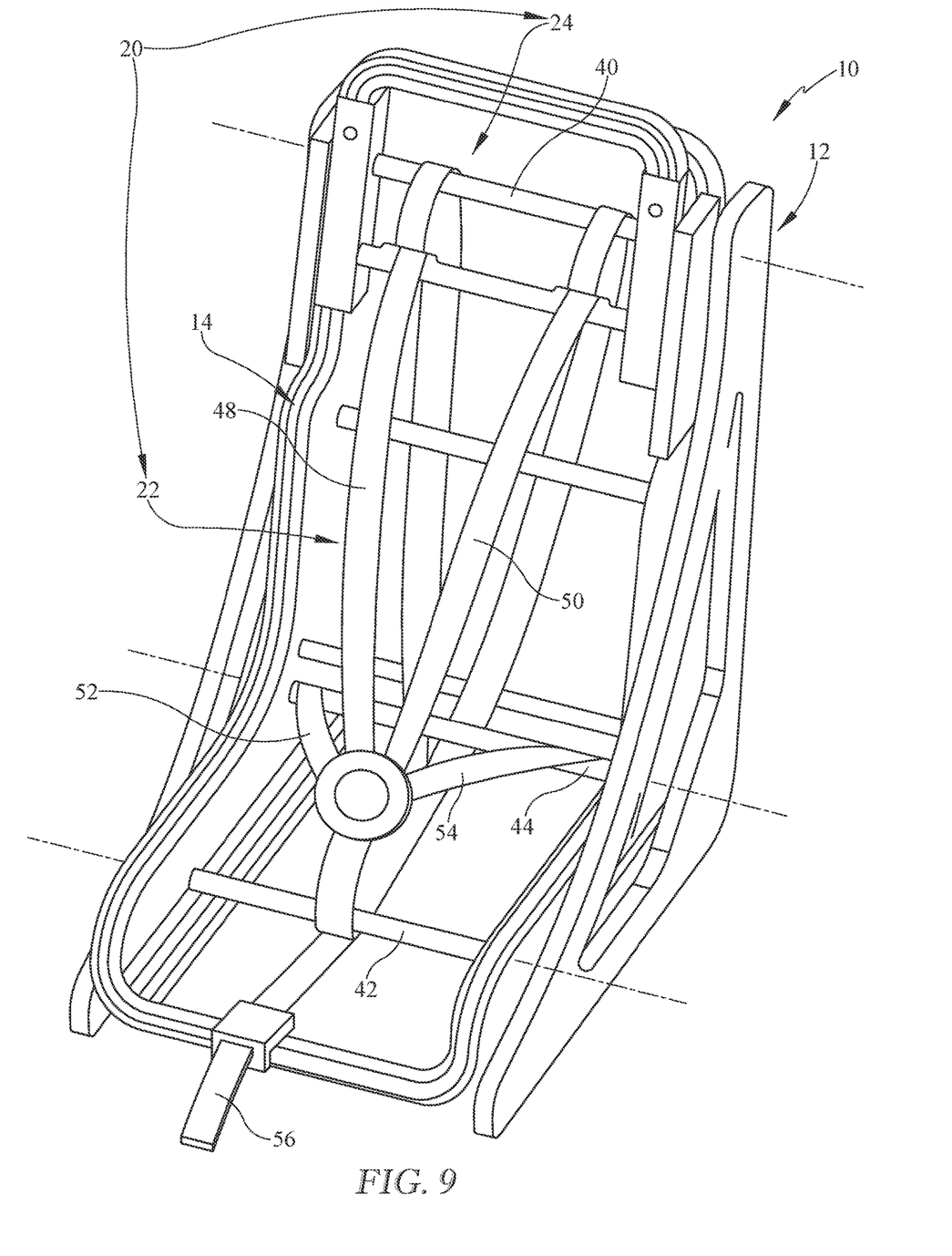
FIG. 9 is a perspective view of the child restraint with the occupant-support pad removed to show each of the strap anchors and the child restraint harness coupled to the strap anchors.

In one example, the occupant-seat anchor system 24 is configured to transfer loads imparted on the child-restraint harness 22 directly into the seat-support shell 12 in response to a front impact event 100 as suggested in FIGS. 4 and 5.

The front impact event causes the child to fall forward into the child restraint harness 22 due to inertial forces acting on the child. The forces are distributed amongst the first, second, and third strap anchors 40, 42, 44 by the shoulder straps 48, 50, crotch strap 46, and hip straps 52, 54, respectively. Since the loads are transferred directly into the seat-support shell 12, the inner juvenile seat 14 can be made with less material, less rigidity, more comfort elements, and/or more ergonomic than other comparable juvenile seats.

The seat chassis 32 includes a seat-bottom base 80, a seat-back base 82 coupled to the seat-bottom base 80, and a body frame 84 coupled to both the seat-bottom base 80 and the seat-back base 82 as shown in FIGS. 1-3. The seat-bottom base 80 and the seat-back base 82 are each adapted to rest on the vehicle seat 11. The seat back-base 82 is arranged to extend upwardly away from the seat-bottom base 80. The body frame 84 extends away from each of the seat-bottom base 80 and the seat-back base 82 along lateral sides of the juvenile seat 14.

The body frame 84 includes a bottom frame foundation 86 coupled to the seat-bottom base 80, a back frame foundation 88 coupled to the seat-back base 82, and a pair of frame side wings 90, 92 as shown in FIGS. 1-3. The bottom frame foundation 86 couples the side wings 90, 92 to the seat-bottom base 80. The back frame foundation 88 couples the side wings 90, 92 to the seat-back base 82. Each of the side wings 90, 92 extends away from the bottom frame foundation 86 and the back frame foundation 88 on opposing sides of the bottom frame foundation 86 and the back frame foundation 88.

The seat-bottom base 80 is formed to include a bottom aperture 93 and the seat-back base 82 is formed to include a back aperture 95 to minimize an amount of material used in forming the seat chassis 32 as shown FIG. 3. The occupant-support pad 34 is configured to overlie at least a portion of each of the apertures 93, 95 to block the child from passing therethrough. In the illustrative embodiment, the back aperture 95 has a height greater than half of a height of the juvenile seat 14.

The occupant-support pad 34 includes a seat bottom web 94, a seat back web 96, and a mesh sheet 98 that overlies the seat bottom web 94 and the seat back web 96. The seat bottom web 94 is coupled to the bottom frame foundation 86. The seat back web 96 is coupled to the back frame foundation 88. The mesh sheet 98 is coupled to the bottom frame foundation 86 and to the back frame foundation 88 and is spaced apart from the seat-bottom base 80 and the seat-back base 82 to support the child in spaced apart relation to the seat-bottom base 80 and the seat-back base 82. In some embodiments, the mesh sheet 98 may be omitted such that only the seat bottom web 94 and the seat back web 96 are used to support the child. In some embodiments, the seat bottom web 94 and the seat back web 96 may be omitted such that only the mesh sheet 98 is used to support the child. The crotch strap 46 and the hip straps 52, 54 are configured to pass though openings formed in the mesh sheet 98 and between individual straps of the seat bottom web 94 to reach their respective strap anchor 42, 44.

The mesh sheet 98 is also spaced apart from the seat bottom web 94 and the seat back web 96 as shown in FIGS. 1 and 6-8. The seat bottom web 94, the seat back web 96, and the mesh sheet 98 are free to move relative to one another and relative to the seat chassis 32 in response to loads acting on the occupant-support pad 34 by the child. For example, the occupant-support pad 34 is configured to provide two-stage load resistance against rear impacts. The occupant support pad 34 provides a first-stage load support under normal seating conditions in which only the mesh sheet 98 stretches or deforms relative to the seat chassis 32 in response to a first load 102 as suggested in FIGS. 6 and 7. The occupant support pad 34 provides a second-stage load support during impact events in which both the mesh sheet 98 and at least one of the seat bottom web 94 and the seat back web 96 stretch or deform together relative to the seat chassis 32 in response to a second load 104, greater than the first load 102, as suggested in FIG. 8.

In the illustrative embodiment, the mesh sheet 98 may have an elasticity that blocks stretching of the mesh sheet 98 all the way to the seat bottom web 94 under normal seating conditions when the child is seated on the juvenile seat 10 (i.e. before impact events). In this instance, the mesh sheet 98 is configured to support the full weight of the child without the seat bottom web 94 until an impact event occurs. In some embodiments, the mesh sheet 98 may configured to support substantially all of the weight of the child under normal seating conditions and the seat bottom web 94 may support a portion of the child's weight.

The mesh sheet 98 may have a first tensile strength while the seat bottom web 94 and the seat back web 96 each have a second tensile strength greater than the first tensile strength to provide greater support than the mesh sheet 98 during impact events. The occupant-support pad 34 may have a cumulative tensile strength sufficient to block deformation of the occupant-support pad 34 all the way to the seat-bottom base 80. Similarly, the mesh sheet 98 may have a first elasticity while the seat bottom web 94 and the seat back web 96 each have a second elasticity less than the first elasticity. These properties provide a more comfortable seating surface for the child via the mesh sheet 98 while providing for increased safety and support via the seat bottom web 94 and the seat back web 96.

The mesh sheet 98 is made from a flexible material and includes a plurality of woven or knitted strands or fibers that cooperate to provide a plurality of openings that allow air to pass through the mesh sheet 98. Because of the plurality of openings, the mesh sheet 98 increases breathability of the juvenile seat 14 by allowing air to pass through the mesh sheet 98 and through empty spaces 106, 108 established on each side of the seat back web 96. Each of the fibers may include cotton, nylon, polyester, any other suitable type of fiber, or a combination thereof. The fibers may be woven or knitted in any suitable arrangement including a plain weave, a twill weave, a plain dutch weave, twill dutch weave, a spiral weave, a satin weave, a basket weave, a leno weave, a warp knit weave, or any other suitable weave or knitting.

The seat bottom web 94 and the seat back web 96 are each formed from the same materials and include a plurality of strips as shown in FIGS. 1-3. Each of the plurality of strips may include a plurality of woven strands or fibers like the mesh sheet 98 except that the plurality of strips are more tightly woven and/or include a different weave than the mesh sheet 98. Each of the fibers may include cotton, nylon, polyester, any other suitable type of fiber, or a combination thereof. The fibers of the strips may be woven or knitted in any suitable arrangement including a plain weave, a twill weave, a plain dutch weave, twill dutch weave, a spiral weave, a satin weave, a basket weave, a leno weave, a warp knit weave, or any other suitable weave or knitting. The plurality of strips are woven such that there are no openings formed therein. However, the plurality of strips are arranged in a grid to provide openings between each strip which allows for air and other components, such as harness straps, to pass therebetween.

The juvenile seat 14 further includes a headrest 110 which may cooperate with the occupant-support pad 34 to support portions of the child along the seat back 38 as shown in FIG. 3. In the illustrative embodiment, the seat back web 96 and the mesh sheet 98 extend from the seat-bottom base 80 to a point that is about half of the height of the seat-back base 82. The headrest 110 then extends from the point to an upper end of the seat-back base 82.

The headrest 110 includes a headrest body 112, a headrest tail 114 coupled to a lower end of the headrest body 112, and a pair of side wings 116, 118 coupled to opposite lateral ends of the headrest body 112 as shown in FIG. 3. The headrest 110 is movable between a fully-raised position to a fully-lowered position. In the fully raised position, a first extent of the headrest tail 114 overlies the seat back web 96. In the fully-lowered position, a second extent of the headrest tail 114, greater than the first extent, overlies the seat back web 96.

In some embodiments, the inner seat unit 14 includes mesh child-support pads 98 that at least partially form a seat bottom and a seat back of the inner seat unit 14. This provides breathability that may reduce the potential of children sweating. Each mesh child-support pad 98 includes a plurality of woven or non-woven fibers that provide a thin, breathable fabric having a backside that is spaced apart from the support frame to allow air to flow behind and under the child seated on the child support pad. The mesh child-support pads 16 have openings between fibers to allow air, moisture, and heat to pass therethrough.

In some embodiments, each mesh child-support pad 98 is coupled to a seat chassis 32 and tensioned to support the child in spaced apart relation to other parts of the seat unit 14 and the support frame 12 in normal circumstances. The mesh child-support pads 98 may be coupled to an intermediate webbing 94, 96 (i.e. by sewing) and may include foam pads in some areas (around the head) for impact protection. Spacing or gaps may be provided between the mesh child-support pads 98 and the intermediate webbing 94, 96. During an impact (i.e. a crash event), the mesh child support pads 98 may flex to close the gaps until the mesh child support-pad 98 reaches the intermediate webbing. The intermediate webbing 94, 96 is flexible but may have a higher tensile strength than the mesh child-support pad so as not to flex as much as the mesh child-support pad 98. In some embodiments, the intermediate webbing 94, 96 may not flex at all but may move slightly relative to the rails when exposed to a force.

In some child restraints, heat can accumulate behind the child while seated in the child seat. The child restraint 10 includes mesh portions 98 and gaps between the mesh portions 98 and structural portions (i.e. frame 12 and rails) of the child restraint 10 to promote air circulation around the child thus dissipating the heat generated by the child's body resulting in the elimination of sweat. The use of a stretched mesh as the seating surface may also provide additional comfort and may eliminate the need to use foam as a comfort layer.

In some embodiments, the structural frame 12 may sit on the vehicle seat and can be attached to the vehicle using either the vehicle seatbelt or through the ISOFIX anchors. The frame 12 may be produced using any of or any combination of the following technologies: gas assisted injection molding process; injection molding process; overmolding of metal structure; alloy injection molding process.

In some embodiments, the seat unit 14 is housed in the structural frame 12. The seat unit 14 may include a frame 32 and a mesh fabric material 98 strung on that frame to form a seating surface for the child. In some embodiments, the mesh 98 may be strung directly on the structural frame 32. The seating surface includes two areas, one to support the child's bottom and the other to support the child's back. These two surfaces include a porous mesh to allow air circulation around the child body. The shape of the frame will extend to limit the lateral movement of the child supporting the shoulders and thighs of the child.

In some embodiments, the seat unit 14 may be fitted with a head rest composed of primarily the same mesh material as the seat unit. The head rest may be movable to adjust to different heights to accommodate different sizes of children. The frame of the headrest shaped with side wings limiting the lateral movement of the head.

In some embodiments, the child restraint 10 further includes a harness system 22. In some embodiments, the harness system is a 5-point harness system. The harness 22 is also fitted with an adjustment mechanism to allow the harness length to be adjusted to fit snugly around different size children. The harness will also be routed through the headrest so the height of the harness will automatically adjust with the height of the headrest.

In some embodiments, the child restraint may further include a recline mechanism 24. The recline mechanism provides for different inclination angles between the seat unit and the frame. The recline mechanism will allow for the seat to be reclined between the different inclinations even after the frame has been attached to the vehicle by either the vehicle seat belt or the ISOFIX anchors. The recline mechanism 24 includes a series of rods 24 coupled to the seat unit 14 and slots formed in the structural frame 12. An actuator handle may be provided for a user to withdraw one or more rods 24 from their respective slot. Ends of the rods 24 that are separable may be chamfered to automatically withdraw and then extend into their slot.

In some embodiments, the child restraint 10 can be used in either forward facing mode for bigger children (over the weight of 26.5 pounds) or rearward facing for smaller children (below the weight of 26.5 pounds). The child restraint 10 may also include a load transfer mechanism. Crash loads may be transferred from the harness 22 to the frame 12 so the seat unit 14 itself will have greater flexibility in the design to focus on ergonomics and breathability. The load transfer mechanism includes a plurality of rods 24 that have multiple functions. First, the rods serve as a harness belt 22 routing to allow for length adjustment of the harness 22 with a change in height of the headrest. In some embodiments, the harness 22 may include a central front adjust system that allows adjustment of all harness belts with just one pull of a central front adjuster belt.

The invention claimed is:

1. A child restraint comprising
an outer seat-support shell adapted to rest on a vehicle seat and to be secured to the vehicle seat for transportation in a vehicle, the outer seat-support shell providing a seat receiving space,
an inner juvenile seat at least partially received in the seat receiving space and configured to provide a child-receiving space sized to receive a child therein, the inner juvenile seat is coupled to the outer seat-support shell so as to be supported in spaced apart relation to the vehicle seat and configured to move relative to the outer seat-support shell to change a recline orientation of the inner juvenile seat relative to the outer seat-support shell, and
an occupant-seat anchor system including a child restraint harness configured to secure the child within the child-receiving space of the inner juvenile seat and a plurality of harness anchors that are connected to both the child restraint harness and the seat-support shell to transfer loads imparted on the child restraint harness by the child directly into the seat-support shell during impact events, wherein the seat-support shell includes a shell bottom and a shell back arranged to extend upwardly away from the shell bottom, and the inner juvenile seat includes a seat bottom coupled to the shell bottom and a seat back coupled to the shell back, and wherein the plurality of harness anchors includes a first strap anchor extending between and interconnecting the shell back and the seat back, a second strap anchor extending between and interconnecting the shell bottom and the seat bottom, and a third strap anchor located between the first and second strap anchors and extending between and interconnecting the seat-support shell and the inner juvenile seat.

2. The child restraint of claim 1, wherein the child restraint harness includes a crotch strap coupled to the second strap anchor, a pair of shoulder straps coupled to the first strap anchor, and a pair of hip anchors coupled to the third strap anchor.

3. The child restraint of claim 2, wherein the child restraint harness further includes a central front adjuster belt that extends from a front end of the seat bottom to the pair of shoulder straps and that is coupled to the first and third strap anchors.

4. The child restraint of claim 1, wherein the third strap anchor is arranged to lie in a pair of guide slots formed in opposing lateral sides of the seat-support shell, and the third strap anchor is slidable through the pair of guide slots to change the recline orientation of the inner juvenile seat relative to the seat-support shell.

5. The child restraint of claim 4, wherein the pair of guide slots includes a forward-facing segment and a rearward-facing segment, and wherein the third strap anchor is arranged to lie in the forward-facing segment when the juvenile seat is arranged in a forward-facing orientation and the third strap anchor is arranged to lie in the rearward-facing segment when the juvenile seat is in a rearward-facing orientation.

6. The child restraint of claim 4, wherein the second strap anchor includes an outer sleeve coupled to a crotch strap of the child restraint harness and an inner pin that is partially received within an interior of the outer sleeve.

7. The child restraint of claim 6, wherein the seat-support shell is formed to include a plurality of recline apertures and the inner pin is movable relative to the outer sleeve to extend into one of the plurality of recline actuators to block movement of the inner juvenile seat relative to the seat-support shell.

8. The child restraint of claim 7, wherein the first strap anchor is arranged to lie in a second pair of guide slots formed in the opposing lateral sides of the seat-support shell and the first strap anchor is slidable through the second pair of guide slots to change the recline orientation of the inner juvenile seat relative to the seat-support shell.

9. A child restraint comprising
an outer seat-support shell adapted to rest on a vehicle seat and to be secured to the vehicle seat for transportation in a vehicle, the outer seat-support shell providing a seat receiving space,
an inner juvenile seat at least partially received in the seat receiving space and configured to provide a child-receiving space sized to receive a child therein, the inner juvenile seat is coupled to the outer seat-support shell so as to be supported in spaced apart relation to the vehicle seat and configured to move relative to the outer seat-support shell to change a recline orientation of the inner juvenile seat relative to the outer seat-support shell, and an occupant-seat anchor system including a child restraint harness configured to secure the child within the child-receiving space of the inner juvenile seat and a plurality of harness anchors that are connected to both the child restraint harness and the seat-support shell to transfer loads imparted on the child restraint harness by the child directly into the seat-support shell during impact events, wherein the juvenile seat includes:
a seat chassis including seat-bottom base, a seat-back base coupled to the seat-bottom base and arranged to extend upwardly away from the seat-bottom base, and body frame coupled to both the seat-bottom base and the seat-back base, and an occupant-support pad including a seat bottom web coupled to the body frame and at least partially spaced apart from the seat-bottom base to support a child above and spaced apart from the seat-bottom base and a seat back web coupled to the body frame and at least partially spaced apart from the seat-back base to support the child in front of and spaced apart from the seat-back base.

10. The child restraint of claim 9, wherein the seat-support shell includes a shell bottom coupled to the seat-bottom base by the occupant-seat anchor system and a shell back coupled to the seat-back base by the occupant-seat anchor system and arranged to extend upwardly away from the shell bottom.

11. The child restraint of claim 10, wherein the plurality of harness anchors includes a first strap anchor extending between and interconnecting the shell back and the seat-back base, a second strap anchor extending between and interconnecting the shell bottom and the seat-bottom base, and a third strap anchor located between the first and second strap anchors and extending between and interconnecting the seat-support shell and the inner juvenile seat.

12. The child restraint of claim 11, wherein the child restraint harness includes a crotch strap fixed to the second strap anchor and arranged to extend upwardly through the seat bottom web into the child-receiving space, a pair of shoulder straps routed around the first strap anchor, and a pair of hip anchors fixed to the third strap anchor.

13. The child restraint of claim 12, wherein the child restraint harness further includes a central front adjuster belt that extends from a front end of the seat-bottom base to the pair of shoulder straps and that is routed around at least the first and third strap anchors.

14. The child restraint of claim 11, wherein the third strap anchor is arranged to lie in a pair of guide slots formed in opposing lateral sides of the seat-support shell, and the third strap anchor is slidable through the pair of guide slots to change the recline orientation of the inner juvenile seat relative to the seat-support shell.

15. The child restraint of claim 14, wherein the first pair of guide slots includes a forward-facing segment and a rearward-facing segment, and wherein the third strap anchor is arranged to lie in the forward-facing segment when the juvenile seat is arranged in a forward-facing orientation and the third strap anchor is arranged to lie in the rearward-facing segment when the juvenile seat is in a rearward-facing orientation.

16. The child restraint of claim 14, wherein the second strap anchor includes an outer sleeve coupled to a crotch strap of the child restraint harness and an inner pin that is partially received within an interior of the outer sleeve.

17. The child restraint of claim 16, wherein the seat-support shell is formed to include a plurality of recline apertures and the inner pin is movable relative to the outer sleeve to extend into one of the plurality of recline actuators to block movement of the inner juvenile seat relative to the seat-support shell.

18. The child restraint of claim 14, wherein the first strap anchor is arranged to lie in a second pair of guide slots formed in the opposing lateral sides of the seat-support shell and the first strap anchor is slidable through the second pair of guide slots to change the recline orientation of the inner juvenile seat relative to the seat-support shell.

* * * * *